W. C. MARTIN.
CUSHION WHEEL CONSTRUCTION.
APPLICATION FILED NOV. 6, 1918.
1,333,928. Patented Mar. 16, 1920.
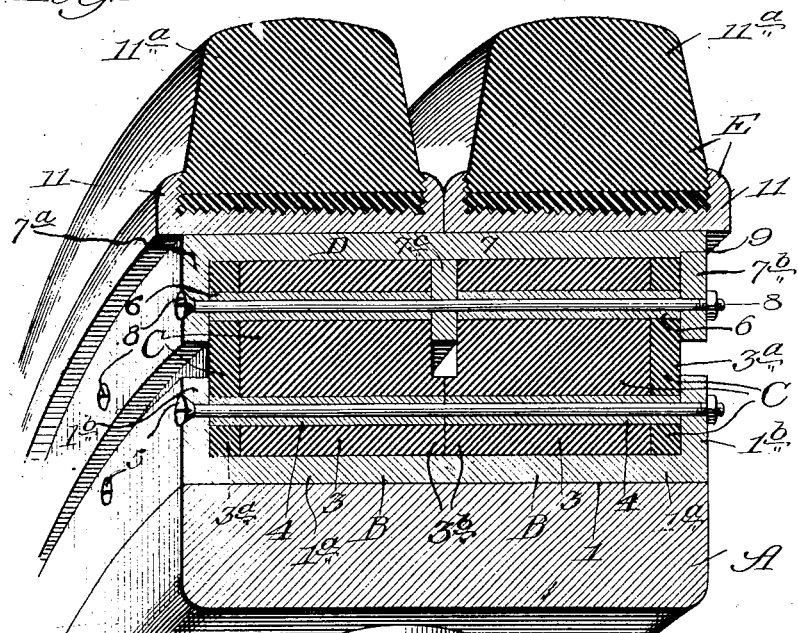
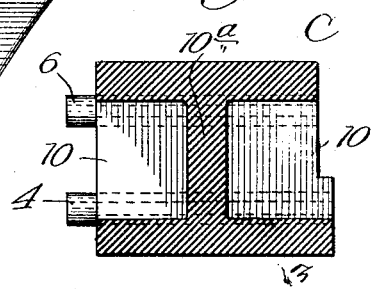
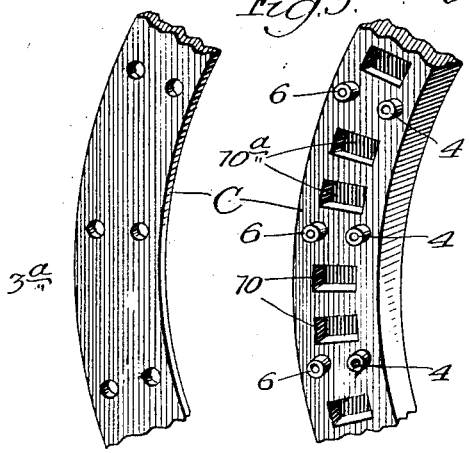
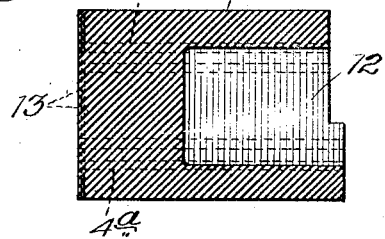
Inventor:
William C. Martin,

UNITED STATES PATENT OFFICE.

WILLIAM C. MARTIN, OF CHICAGO, ILLINOIS, ASSIGNOR TO MORAND BROS.-MARTIN CUSHION-WHEEL COMPANY, OF CHICAGO, ILLINOIS, A CORPORATION OF ILLINOIS.

CUSHION-WHEEL CONSTRUCTION.

1,333,928.  Specification of Letters Patent.  Patented Mar. 16, 1920.

Application filed November 6, 1918. Serial No. 261,314.

*To all whom it may concern:*

Be it known that I, WILLIAM C. MARTIN, a citizen of the United States, residing at Chicago, in the county of Cook and State of Illinois, have invented a new and useful Cushion-Wheel Construction, of which the following is a specification.

This invention relates particularly to cushion wheel construction adapted for use in connection with heavy auto-trucks, where a very wide or dual tire is employed.

The primary object is to provide cushion wheel construction which is simple, comparatively inexpensive, which is capable of resisting enormous strains, and which is adapted to distribute the stresses arising from heavy shocks throughout the circumference of the special cushion elements employed in the construction.

The invention is illustrated in its preferred embodiment in the accompanying drawing, in which—

Figure 1 represents a broken sectional perspective view of a cushion wheel constructed in accordance with the invention; Fig. 2, a sectional view of one of the main cushion members employed, the section being taken parallel with the section shown in Fig. 1; Fig. 3, a broken perspective view showing one of the main cushion members and an auxiliary cushion member or gasket constituting one of the cushion elements of the construction; and Fig. 4, a sectional view of a modified cushion element.

In the construction illustrated, A represents the felly of the wheel; B, an inner cushion-rim which is shrunk upon the felly A and which is provided with a circumferential channel; C, C, two annular, resilient cushion elements employed, which are seated and firmly secured in the channel of the inner cushion rim B; D, an outer cushion-rim provided with two annular channels in which the outer circumferential portions of the cushion elements C are received and firmly secured; and E, a dual tire mounted on the outer cushion-rim D.

The construction is illustrated in connection with a wooden wheel having the felly A and spokes A¹.

The inner cushion-rim B preferably comprises an annular channel-form steel member 1, having a felly-embracing portion 1ª and side-flanges 1ᵇ. This channel-form rim is shrunk upon the felly A.

Each of the cushion elements C preferably comprises an annular resilient and elastic rubber member 3, constituting the main cushion member; and an annular elastic, resilient ring 3ª which serves as a gasket. Each cushion element 3 is provided at its inner circumferential portion with an annular series of perforations fitted with metal bushings 4, which may be embedded in the rubber in the molding operation. The inner ends of the sleeves or tubes 4 are flush with the inner lateral surfaces of the cushion members 3; and the outer ends project sufficiently beyond the outer lateral surfaces of the members 3 to extend through annular inner series of perforations with which the gasket members 3ª are provided. The cushion elements C have enlargements or offsets 3ᵇ at the inner lateral sides of their inner circumferential portions; and said cushion elements are connected to the inner cushion-rim by bolts 5 which extend through the flanges and through the inner series of bushings, thus securely uniting the inner circumferential portions of the cushion elements to the inner cushion rim. The cushion members 3 may be molded in two or more sections, and may be secured in the inner cushion rim after the rim has been shrunk on the felly.

Each cushion member 3 is further provided with an outer annular series of bushings 6, which may be embedded in the cushion member in the molding operation. The inner ends of the bushings 6 extend flush with the inner lateral surfaces of the cushion members 3, and the outer ends of the bushings project beyond the outer lateral surfaces of the members 3 sufficiently to extend through outer annular series of perforations with which the members 3ª are provided.

The outer cushion-rim D preferably comprises an annular angle-form steel member having a wide thread-flange 7 and an integral side flange 7ª; a detachable side flange 7ᵇ; and an intermediate flange 7ᶜ. Thus, the outer cushion rim D is provided with two inwardly open annular channels which receive the outer circumferential portions of the cushion elements C. The bushings 6 extend from the intermediate flange 7ᶜ to the side flanges 7ª and 7ᵇ; and the outer cushion rim D is firmly secured to the cushion elements C by means of bolts 8, which extend through the flanges and the interposed bushings. The intermediate flange 7ᶜ is adapted to strengthen the wide tread-flange 7, and the tread flange may be shrunk upon the flange 7ᶜ after the left hand cushion element C is in position; or the intermediate flange 7ᶜ may be forced into the tread flange 7. However, it is desirable to introduce the separately formed intermediate flange 7ᶜ between the cushion elements and then shrink the annular member comprising the tread flange 7 and integral flange 7ᵃ upon the cushion elements and the intermediate flange 7ᶜ, so that the cushion elements are normally under some compression. The detachable side flange 7ᵇ preferably fits within the marginal portion of the tread flange 7, preferably being received by an annular rabbet 9.

The cushion members 3 are preferably molded from a suitable rubber compound and provided, in the molding operation, with annular series of lateral recess 10, these recesses being located opposite each other, as shown in Fig. 2, and being separated by webs 10ᵃ. The member 3 is preferably formed in two sections, which, when put together in the channel of the inner cushion rim B, form an annulus. If desired, the auxiliary cushion member or gasket 3ᵃ may be formed in sections, but preferably the gasket is of integral formation. The flexible, resilient annular members 3ᵃ serve to cover the recesses 10 at the outer lateral sides of the cushion members 3, and serve effectually to exclude mud, water, dust, etc. These gaskets may have reinforcing plies of fabric therein, if desirable.

Upon the outer rim member D is mounted a tire E. In the illustration given the tire E comprises a pair of channel form steel tire rims 11, and a pair of solid rubber tire elements 11ᵃ mounted therein. The rubber tire elements 11ᵃ are preferably vulcanized in the channel form members or base-portions 11 in a well known manner. The members 11 may be forced upon the outer cushion rim D under a pressure of many tons, so that, in effect, the parts will be permanently united.

It is not unusual to provide so-called "dual tires" with very wide treads, the fellies being commonly of a width of ten inches. It is desirable, therefore, to provide in the cushion construction for intermediate reinforcement of the outer cushion rim and tire. This is accomplished, in the illustration given, by means of the intermediate flange 7ᶜ of the outer cushion rim.

Inasmuch as the cushion elements are firmly secured both to the inner and the outer channel-form cushion rims, it will be understood that deformation of the tire and outer rim are resisted both by compression of the rubber cushion elements at some portions of their circumference and by tension exerted upon the rubber cushion elements at other portions of their circumference. The effect is to distribute shocks throughout the entire circumference of the cushion elements. It is noted that there is sufficient space between the opposed flanges of the two cushion rims to permit such relative movements of the rims as may be necessary to properly cushion the shocks to which the wheels are subjected. The construction is such as to afford the desired resiliency in a radial direction, and also to cushion and withstand heavy shocks in a lateral direction, such as might occur, for instance, in striking a curb in rounding a corner.

The construction described combines great strength, resiliency and lightness, and is capable of distributing and dissipating shocks to an extraordinary extent; and the tendency of the wheel to return to its normal shape after excessive shock will be appreciated from the explanation given.

In Fig. 4, C¹ represents a modified form of cushion element. In this form, the outer gaskets are dispensed with and each cushion element comprises a single annular resilient rubber member of such width that the two members fill the spaces between the flanges of the rims. That is, each member is of the width of the member shown in Fig. 2 plus the thickness of the gasket. Of course, the cushion element C¹ may be molded in two half-circular sections, which, when put together, form a complete annulus. These sections may have mortised or rabbeted ends to afford suitable overlaps at the meeting ends, if desired.

In the form shown in Fig. 4, the inner lateral side of the cushion element is provided with an annular series of recesses 12, while the outer lateral surface is flat or unbroken. If desired, the outer lateral portion of the element C¹ may have reinforcing fabric 13 embedded therein or vulcanized thereto. The cushion element also has molded therein an inner annular series of bushings 4ᵃ and an outer annular series of bushings 6ᵃ, whose ends are flush with the lateral surfaces of the cushion element.

The foregoing detailed description has been given for clearness of understanding only and no unnecessary limitation should be understood therefrom but the appended claims should be construed as broadly as permissible in view of the prior art.

What I regard as new and desire to secure by Letters Patent is:

1. In a cushion wheel, the combination of an inner cushion-rim comprising an annular channel-form member; annular rubber cushion elements having their inner circumferential portions seated in said channel; bolts extending through the flanges of said inner rim and the interposed portions of said cushion elements; an outer cushion-rim comprising an angle member having an integral side flange, a detachable side flange and an intermediate flange forming two channels receiving the outer circumferential portions of said cushion elements; and bolts extending through said last-named flanges and the outer circumferential portions of said cushion elements.

2. In a cushion wheel, the combination of a felly; an inner cushion-rim mounted on said felly and equipped with side flanges; a pair of annular rubber cushion elements seated in said rim and provided with inner annular series of bushings and outer annular series of bushings; bolts extending through said flanges and the inner series of bushings; an outer cushion-rim having side flanges and an intermediate flange affording two channels receiving the outer portions of said cushion elements, said outer rim being sectionally formed to permit introduction of said cushion elements; bolts extending through said last-named flanges and the outer series of bushings; and a tire mounted on said outer cushion-rim.

3. In a cushion wheel, the combination of a felly; an inner cushion-rim provided with a felly-embracing portion shrunk upon said felly and provided with side flanges; a pair of resilient rubber cushion elements seated in said rim, each comprising a main cushion member provided with lateral recesses and an auxiliary cushion member embracing the outer side of the main cushion member and serving as a gasket, said cushion elements being provided with inner series of bushings whose inner ends abut against each other and whose outer ends abut against the inner surfaces of the flanges of the inner cushion-rim, and said cushion elements being also provided with outer annular series of bushings; an outer cushion rim comprising a tread portion and side flanges and an intermediate flange, said outer cushion-rim being sectionally constructed to admit the cushion elements between the flanges thereof; and bolts connecting the flanges of each of said cushion-rims and extending through the interposed bushings of the corresponding series.

4. In a cushion wheel, the combination of an inner cushion-rim provided with side flanges; an outer cushion-rim provided with side flanges opposed to said first-named flanges and spaced with relation thereto and provided also with an intermediate flange, said outer rim being sectionally constructed to admit cushion elements; a pair of annular rubber cushion elements having reduced outer circumferential portions interposed between the intermediate flange and side flanges of said outer cushion-rim and having enlarged inner circumferential portions which abut against each other, said cushion elements being provided with inner annular series of bushings which are complemental and abut against each other and are interposed between the flanges of the inner cushion-rim and being provided also with annular outer series of bushings which are interposed between the intermediate flange and side flanges of the outer cushion-rim; and inner and outer series of bolts connecting, respectively, the flanges of said rims and extending through the corresponding interposed bushings.

WILLIAM C. MARTIN.